(12) United States Patent
Chang et al.

(10) Patent No.: US 7,626,907 B2
(45) Date of Patent: Dec. 1, 2009

(54) METHOD AND APPARATUS FOR DETERMINING TYPE OF DIGITAL VERSATILE DISC

(76) Inventors: Ricky Chang, 8F, No. 533, Chung-Cheng Rd., Hsin-Tien City, Taipei Hsien (TW); Allen Lu, 8F, No. 533, Chung-Cheng Rd., Hsin-Tien City, Taipei Hsien (TW)

( * ) Notice: Subject to any disclaimer, the term of this patent is extended or adjusted under 35 U.S.C. 154(b) by 604 days.

(21) Appl. No.: 10/908,746

(22) Filed: May 25, 2005

(65) Prior Publication Data

US 2005/0265188 A1    Dec. 1, 2005

Related U.S. Application Data

(60) Provisional application No. 60/574,665, filed on May 25, 2004.

(30) Foreign Application Priority Data

Sep. 15, 2004   (TW) .............................. 93127819 A
Oct. 6, 2004    (TW) .............................. 93130202 A (51) Int. Cl.
   *G11B 7/00* (2006.01)
(52) U.S. Cl. .................. 369/53.22; 369/53.23
(58) Field of Classification Search ................ 369/53.2, 369/53.22, 53.23
   See application file for complete search history.

(56) References Cited

U.S. PATENT DOCUMENTS

| | | | |
|---|---|---|---|
| 5,003,521 A | 3/1991 | Yoshida et al. |
| 5,381,392 A | 1/1995 | Hira |
| 5,506,824 A | 4/1996 | Fairchild et al. |
| 5,724,325 A | 3/1998 | Jeong |
| 5,745,460 A | 4/1998 | Tateishi |
| 5,764,610 A | 6/1998 | Yoshida et al. |
| 5,831,952 A | 11/1998 | Yamada et al. |
| 5,903,531 A | 5/1999 | Satoh et al. |
| 5,917,791 A | 6/1999 | Tsuchiya et al. |
| 5,959,955 A | 9/1999 | Choi |
| 6,005,832 A | 12/1999 | Kumagai |
| 6,052,344 A | 4/2000 | Ueki |
| 6,212,141 B1 | 4/2001 | Tanikawa et al. |
| 6,249,499 B1 | 6/2001 | Andoh |
| 6,295,260 B1 | 9/2001 | Shihara et al. |
| 6,449,232 B1 | 9/2002 | Kuwahara et al. |
| 6,459,666 B1 | 10/2002 | Yokoi |

(Continued)

FOREIGN PATENT DOCUMENTS

BR    P10418819    11/2007

(Continued)

*Primary Examiner*—Thang V Tran
*Assistant Examiner*—Van N Chow
(74) *Attorney, Agent, or Firm*—Perkins Coie LLP (57) ABSTRACT

A method and an apparatus for determining types of digital versatile discs (DVDs) are provided. The method includes setting related parameters, acquiring a wobble signal from a DVD, setting a frequency dividing factor, and dividing the frequency of the wobble signal by the frequency dividing factor. Then, the time required for the digital versatile disc to spin one round, which is driven by a spindle motor of a disc player, is set as a unit time to calculate the frequency of the frequency-divided wobble signal. Finally, the type of the digital versatile disc is determined according to the frequency of the wobble signal.

22 Claims, 4 Drawing Sheets

U.S. PATENT DOCUMENTS

| | | | |
|---|---|---|---|
| 6,603,720 B1 * | 8/2003 | Kuroda et al. | 369/53.23 |
| 6,700,847 B2 | 3/2004 | Osada | |
| 6,728,181 B2 | 4/2004 | Shimoda et al. | |
| 6,747,931 B1 | 6/2004 | Park et al. | |
| 6,760,289 B1 | 7/2004 | Ide | |
| 6,807,136 B1 | 10/2004 | Grimm | |
| 6,816,443 B1 | 11/2004 | Hwang et al. | |
| 6,822,936 B2 | 11/2004 | Ono et al. | |
| 6,856,586 B2 | 2/2005 | Usui et al. | |
| 6,909,678 B2 | 6/2005 | Morishima | |
| 6,925,039 B2 | 8/2005 | Yanagawa et al. | |
| 6,980,500 B2 | 12/2005 | Lu et al. | |
| 6,992,961 B2 | 1/2006 | Minase et al. | |
| 7,016,284 B2 | 3/2006 | Chou | |
| 7,046,593 B2 | 5/2006 | Ito | |
| 7,099,253 B2 | 8/2006 | Hsu et al. | |
| 7,136,340 B2 * | 11/2006 | Ide et al. | 369/53.34 |
| 2002/0015017 A1 | 2/2002 | Kwag | |
| 2002/0075780 A1 * | 6/2002 | Ogihara | 369/53.23 |
| 2002/0126607 A1 | 9/2002 | Yamamoto et al. | |
| 2002/0150017 A1 | 10/2002 | Ono et al. | |
| 2003/0099171 A1 | 5/2003 | Ito | |
| 2004/0081049 A1 | 4/2004 | Chan | |
| 2004/0130986 A1 | 7/2004 | Minase et al. | |
| 2004/0218497 A1 * | 11/2004 | Choi et al. | 369/53.23 |
| 2005/0047300 A1 * | 3/2005 | Ono et al. | 369/53.23 |
| 2005/0058036 A1 * | 3/2005 | Chen et al. | 369/53.2 |
| 2005/0105433 A1 | 5/2005 | Juan et al. | |
| 2005/0226114 A1 | 10/2005 | Liow et al. | |
| 2005/0265187 A1 | 12/2005 | Chang et al. | |
| 2005/0265188 A1 | 12/2005 | Chang et al. | |
| 2005/0265189 A1 | 12/2005 | Tai | |
| 2006/0198268 A1 | 9/2006 | Chan | |

FOREIGN PATENT DOCUMENTS

| | | |
|---|---|---|
| BR | P10418821 | 11/2007 |
| CN | 1348181 | 5/2002 |
| CN | 1348181 A | 5/2002 |
| CN | 1348181 A | 5/2002 |
| CN | 1366660 | 8/2002 |
| CN | 1490790 | 4/2004 |
| CN | 1490790 A | 4/2004 |
| CN | 1591643 | 3/2005 |
| CN | 1601639 | 3/2005 |
| CN | 1637909 | 7/2005 |
| CN | 1658312 | 8/2005 |
| CN | 1700311 | 11/2005 |
| DE | 10349161 | 6/2004 |
| EP | 0725395 | 6/1996 |
| EP | 0784321 | 7/1997 |
| EP | 0811971 | 12/1997 |
| EP | 0813192 | 12/1997 |
| EP | 0903735 | 3/1999 |
| GB | 2394596 | 4/2004 |
| JP | 10302381 | 11/1998 |
| JP | 2000078392 | 3/2000 |
| JP | 2000-322742 | 11/2000 |
| JP | 2000315355 | 11/2000 |
| JP | 2000322742 | 11/2000 |
| JP | 2001126376 | 5/2001 |
| JP | 2001167510 | 6/2001 |
| JP | 2001265620 | 9/2001 |
| JP | 2002007156 | 1/2002 |
| JP | 2002119830 | 4/2002 |
| JP | 2002312933 | 10/2002 |
| JP | 2003016441 | 1/2003 |
| JP | 2003-078392 | 3/2003 |
| JP | 2003078392 | 3/2003 |
| JP | 2003217135 | 7/2003 |
| TW | 200511273 | 3/2005 |
| TW | 200539114 | 12/2005 |
| TW | 200539115 | 12/2005 |
| TW | 253060 | 4/2006 |
| TW | 1298156 | 6/2008 |
| WO | 03/005350 | 1/2003 |
| WO | WO-2003005350 | 1/2003 |
| WO | WO-2005117009 | 12/2005 |
| WO | WO-2005117008 | 12/2008 |

\* cited by examiner

METHOD AND APPARATUS FOR DETERMINING TYPE OF DIGITAL VERSATILE DISC

CROSS-REFERENCE TO RELATED APPLICATION

This application claims the priority benefits of U.S. provisional application titled "NEW METHOD OF IDENTIFYING ROM/R/RW TYPE OF DVD DISC (USING TE SIGNAL, RECD SIGNAL AND RFLVL SIGNAL)" filed on May 25, 2004, Ser. No. 60/574,665. All disclosure of this application is incorporated herein by reference. This application also claims the priority benefit of Taiwan applications serial no. 93130202, filed on Oct. 6, 2004, serial no. 93127819, filed on Sep. 15, 2004. All disclosure of these Taiwan applications is incorporated herein by reference.

BACKGROUND OF THE INVENTION

1. Field of the Invention

The present invention relates to a method and an apparatus for determining types of digital versatile discs, and more particularly to a method and an apparatus for determining DVD-ROM, DVD− and DVD+ types of digital versatile discs.

2. Description of the Related Art

Digital versatile discs (DVDs) available in the market include a read-only-memory (DVD_ROM) type, from which data can only be read, and another type in which data can be written/burned. The data-burnable DVDs include DVD− and DVD+ based on different specifications. Most DVD players are compatible in different specifications. Therefore, how to determine a type of a disc has become an essential technique.

Figure 1:
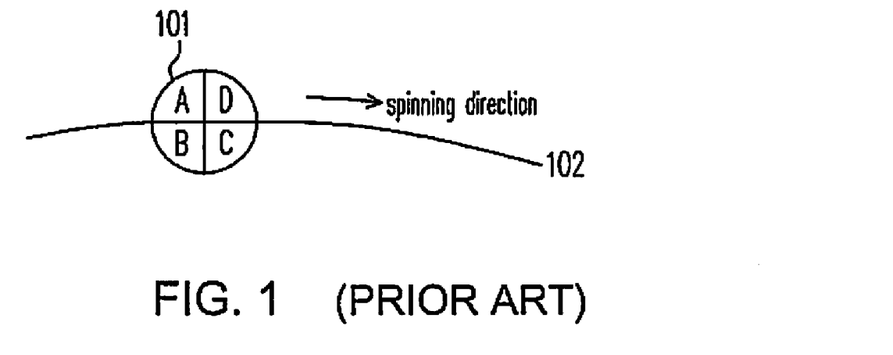
FIG. 1 is a schematic drawing showing the source of a wobble signal.

The conventional method is to use position data contained in pre-groove wobble signals to determine the types of DVDs. According to the specifications of DVDs, DVD-ROM does not contain wobble signals. In contrary, DVD− and DVD+ contain not only normal tracks but also wobble signals. The source of these signals is shown in FIG. 1. When a disc spins in a DVD player, the pick-up head 101 slides outwardly along the track 102 as shown in FIG. 1. Photo diodes of the pick-up head 101 are arranged as shown in FIG. 1. These areas A, B, C and D sense signals with different intensities. Accordingly, wobble signals can be generated according to the following formula:

$$G \times [g1 \times (A+D) - g2 \times (B+C)]$$

Wherein, G, g1 and g2 are adjustable gains.

Figure 2:
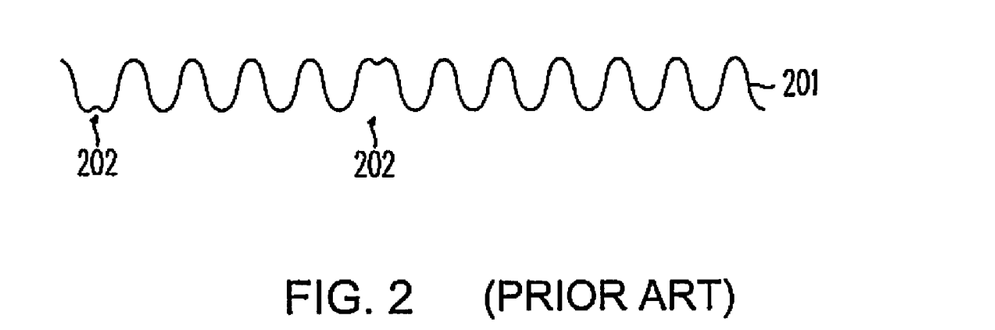
FIG. 2 is a schematic drawing showing a wobble signal of DVD+.
Figure 3:
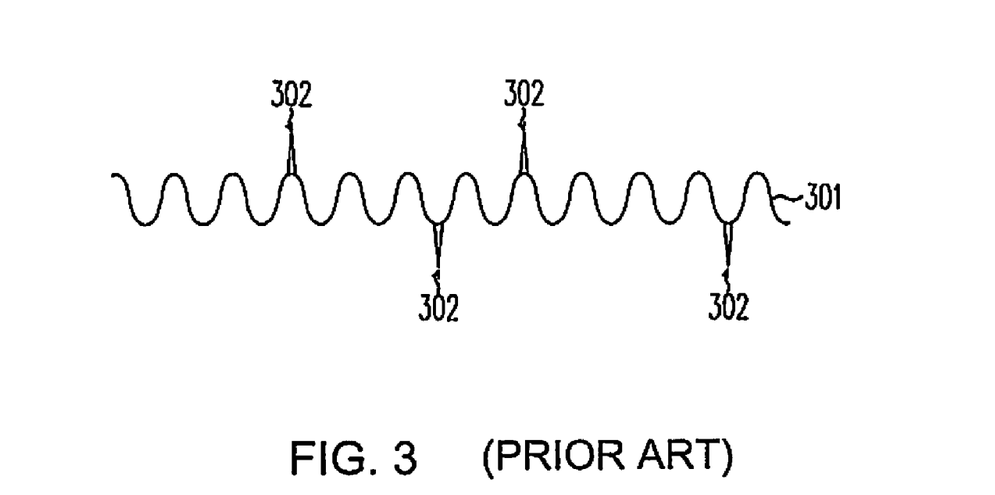
FIG. 3 is a schematic drawing showing a wobble signal of DVD−.

DVD− and DVD+ have position data which are contained in wobble signals and can be decoded by logic operational circuits in order to obtain the present position data. FIG. 2 is a schematic drawing showing a wobble signal of DVD+. The wobble signal 201 includes plural phase change regions 202. The position data can be obtained from the wobble signal 201 after the wobble signal 201 is decoded by the logic operational circuit. FIG. 3 is a schematic drawing showing a wobble signal of DVD−. The wobble signal 301 includes plural land per-pits 302. Similarly, the position data can be obtained after the wobble signal 301 is decoded by the logic operational circuit. From FIGS. 2 and 3, it can be seen that for different wobble signals of DVD+ and DVD−, the decoding functions of the logic operational circuits are also different. Accordingly, they can be used to determine the types of DVDs.

Figure 4:
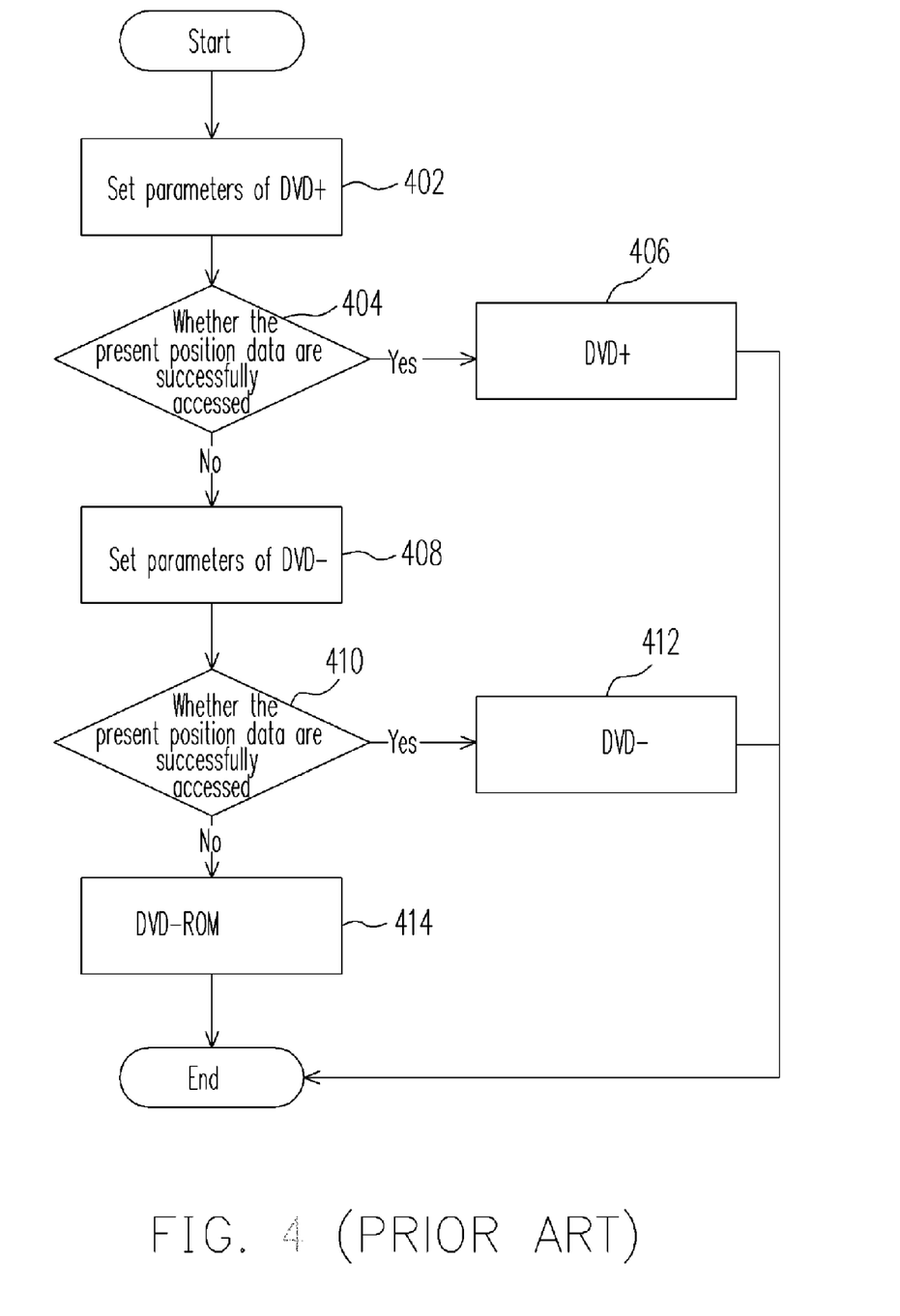
FIG. 4 is a flowchart of a conventional method for determining a type of a digital versatile disc.

FIG. 4 is a flowchart showing a conventional method for determining a type of a digital versatile disc. First, in step 402, it is assumed that the loaded disc is DVD+, and the parameters for DVD+ are set. In step 404, determining whether the present position data are successfully accessed. If the data can be accessed, it is determined the disc is DVD+ in step 406. If not, it is assumed the disc is DVD− in step 408, and the parameters for DVD− are set. In step 410, determining whether the present position data are successfully accessed again. If the data can be accessed, it is determined the disc is DVD− in step 412. If not, it is determined the disc is DVD-ROM in step 414.

The disadvantage of this method is that the parameters of DVD+ and DVD− must include parameters of most discs, especially for burned discs. Since the quality of position data on burned discs become worse, false determination is very likely to occur. Accordingly, a new method is desired to resolve the issue and enhance the probability of correctly determining the types of DVDs.

SUMMARY OF THE INVENTION

Accordingly, the present invention is directed to a method for determining a type of a digital versatile disc to overcome the false determination defect of the conventional technology.

The present invention is also directed to an apparatus for determining a type of a digital versatile disc to overcome defects of the conventional technology and enhance the probability of correctly determining the type of digital versatile discs.

In order to achieve the above and other objects, a method for determining a type of a digital versatile disc is provided according to an embodiment of the present invention, which mainly comprises setting relative parameters, acquiring a wobble signal from a digital versatile disc, setting a frequency dividing factor, and dividing the frequency of the wobble signal with the frequency dividing factor. Then, the time required for the digital versatile disc to spin one round, which is driven by a spindle motor of a disc player, is set as a unit time to calculate the frequency of the frequency-divided wobble signal. Finally, the type of the digital versatile disc is determined according to the frequency of the wobble signal.

In order to achieve the above and other objects, an apparatus for determining a type of a digital versatile disc is provided according to an embodiment of the present invention. The apparatus comprises an acquisition apparatus, which acquires a wobble signal from a digital versatile disc, digitalizes the wobble signal and outputs the digitalized wobble signal; and a determining apparatus, which is coupled to the acquisition apparatus, determining and outputting the type of the digital versatile disc according to the frequency of the wobble signal. Wherein, the determining apparatus further comprises a filter coupled to an input terminal of the determining apparatus, used for receiving the digitalized wobble signal, filtering noises in the wobble signal, and outputting the filtered wobble signal; a frequency counter coupled to the filter, calculating and outputting the frequency of the wobble signal according to the filtered wobble signal; and a determining device coupled to the frequency counter, used for determining and outputting the type of the digital versatile disc according to the frequency of the wobble signal.

In the present invention, the type of the digital versatile disc is determined according to the frequency of the wobble signal, rather than the position data contained in the wobble signal in the conventional technology. Disadvantages in the conventional technology, such as false determination and incompatibility between position data and different disc players, can be avoided. Accordingly, the probability of correctly determining the type of the digital versatile disc can thus be enhanced.

The above and other features of the present invention will be better understood from the following detailed description of the embodiments of the invention that is provided in communication with the accompanying drawings.

DESCRIPTION OF SOME EMBODIMENTS

The present invention uses frequencies of wobble signals of digital versatile discs to identify three types of the digital versatile disc, DVD read-only-memory (DVD-ROM), DVD−, and DVD+. The following is description of the method and apparatus for determining types of digital versatile discs according to the present invention.

Different types of DVDs have different frequencies of wobble signals. When the data transfer rate is 1×1349 KB/s, and the time required for the disc to spin a round, which is driven by a spindle motor of a disc player, is set as a unit time, the frequency of the wobble signal of DVD+ is 817.5 KHz, the frequency of the wobble signal of DVD− is 140.6 KHz, and DVD-ROM does not contain any frequency of the wobble signal thereon and thus has a frequency 0. The difference among these frequencies is the basis for determining types of digital versatile discs in the present invention.

For disc players, the actual frequency calculation is more complicated. Most of the disc players use the constant angular velocity (CAV) mode. The data transfer rates at the innermost circle and the outermost circle are apparently different. That is, frequencies of wobble signals of DVD− and DVD+ are within a range, rather than constant values. In the logic circuit of analyzing the wobble signals, the step of frequency dividing may be applied. The step of frequency dividing is used to reduce the frequency of the wobble signal with a frequency dividing factor. For example, if the frequency dividing factor is ½, the frequency of the frequency-divided wobble signal is a half of the frequency of the original wobble signal. Accordingly, the frequency of the wobble signal at the innermost circle of the DVD+ is:

817.5 KHz×data transfer rate of the innermost circle×frequency dividing factor. The frequency of the wobble signal at the outermost circle of the DVD+ is:

817.5 KHz×data transfer rate of the outermost circle×frequency dividing factor. Accordingly, the frequency of the wobble signal at the innermost circle of the DVD− is:

140.6 KHz×data transfer rate of the innermost circle×frequency dividing factor, and the frequency of the wobble signal at the outermost circle of the DVD− is:

140.6 KHz×data transfer rate of the outermost circle×frequency dividing factor.

Figure 5:
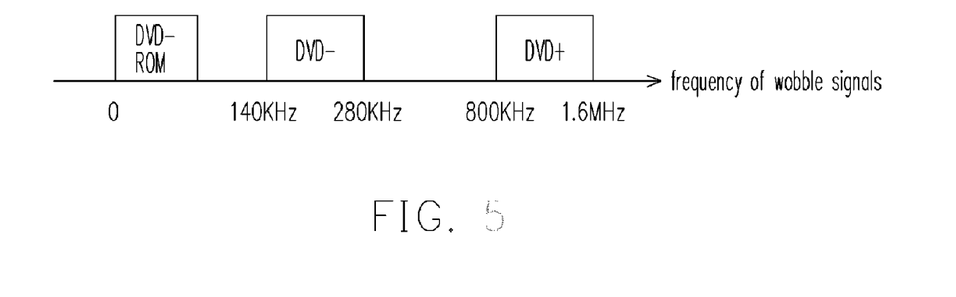
FIG. 5 is a configuration showing ranges of wobble signal frequencies of three digital versatile discs for an apparatus for determining a type of a digital versatile disc according to an embodiment of the present invention.

In this embodiment, the disc player spins the disc in the 4× CAV mode. As a result, the data transfer rate of the innermost circle is 2×, the data transfer rate of the outermost circle is 4×, and the frequency dividing factor is ½. After a simple calculation, the range of the frequency of the DVD+ wobble signal is 800 KHz-1.6 MHz, the range of the frequency of the DVD− wobble signal is 140 KHz-280 KHz, and the frequency of the DVD-ROM is 0 as shown in FIG. 5. Actually, the DVD-ROM, due to errors in real operations, may still generate some frequency in the wobble signal. The minor frequency of the wobble signal, however, will not affect determinations in the present invention.

It can be observed in FIG. 5, under a constant spinning speed, the frequency ranges of the three discs do not overlap, and in fact the frequency ranges are very different from each other. The false determination resulting from accessing different wobble signal frequencies at different locations can be avoided.

The present embodiment includes the step of frequency dividing. All parameters and details have been modified based on requirements of frequency dividing, which actually can be skipped. Without frequency dividing, the effect of the dividing factor in the frequency range of the wobble signal in FIG. 5 should be removed. In the schematic drawing of FIG. 6, devices related to frequency dividing should be removed. In the flowchart of FIG. 7, steps related to frequency dividing should also be skipped. One of ordinary skill in the art can easily modify the present invention after reading the description of this embodiment.

Figure 6:
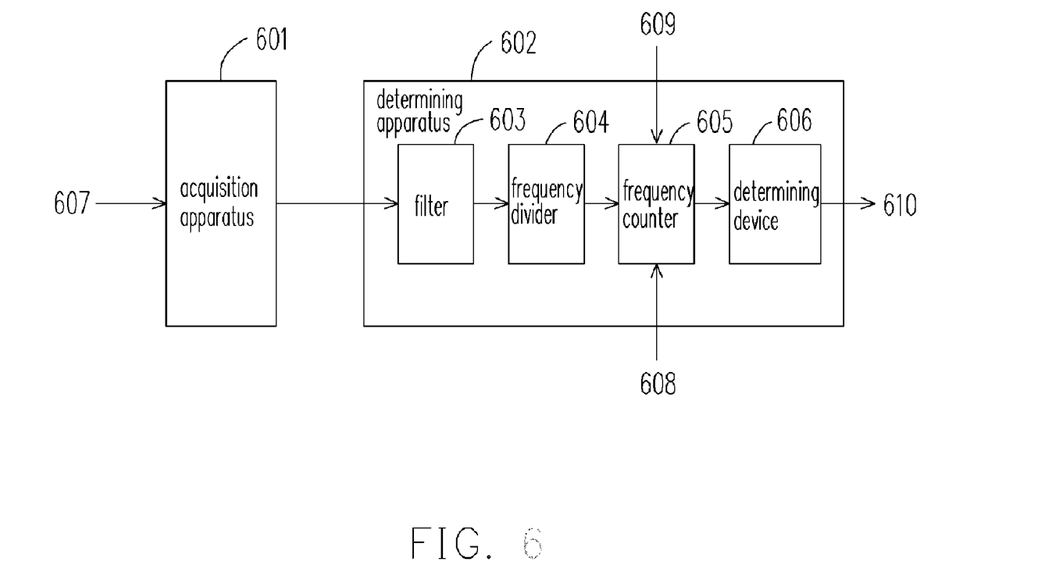
FIG. 6 is a schematic drawing showing an apparatus for determining a type of a digital versatile disc according to an embodiment of the present invention.
Figure 7:
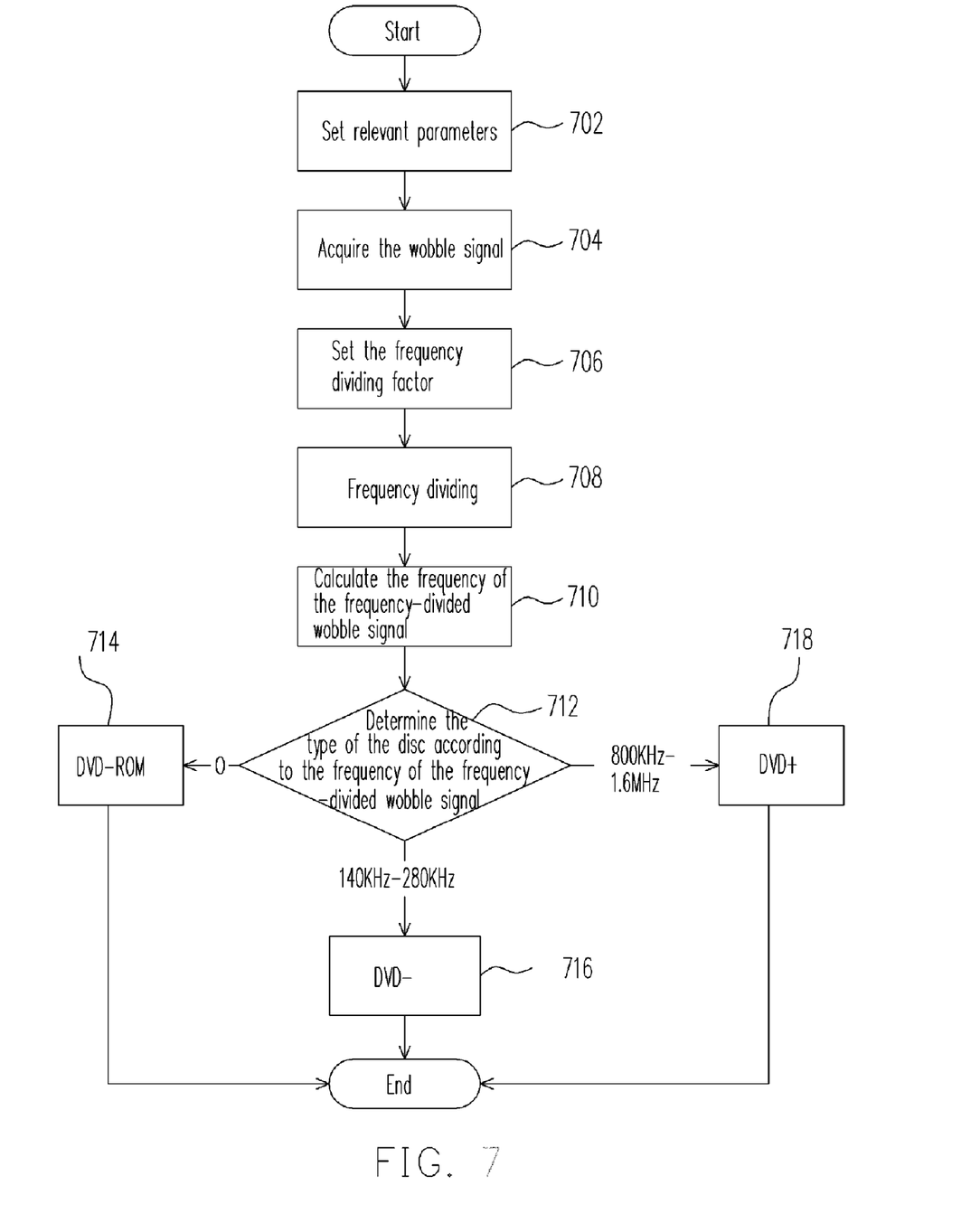
FIG. 7 is a flowchart of a method for determining a type of a digital versatile disc according to an embodiment of the present invention.

FIG. 6 is a schematic drawing showing an apparatus according to an embodiment of the present invention. As shown in FIG. 6, a acquisition apparatus 601 acquires a wobble signal 607 from the digital versatile disc, digitalizes and outputs the wobble signal 607 to a determining apparatus 602. The determining apparatus 602, according to the frequency of the wobble signal 607, determines the type of the digital versatile disc and outputs a type signal 610.

The determining apparatus 602 comprises several devices. First, a filter 603 receives the digitalized wobble signal 607, filters noises in the wobble signal 607, and outputs the filtered wobble signal to a frequency divider 604. When noises are not so serious to cause false determination, the step of filtering the noises or the filter 603 can be skipped or removed. The frequency divider 604 divides the frequency of the wobble signal 607 by a preset frequency dividing factor, ½ in this embodiment, and outputs the frequency-divided wobble signal to the frequency counter 605.

The frequency counter 605 receives a spinning speed signal 609 transmitted from the spindle motor (not shown) of the disc player. According to the spinning speed signal 609 and the unit time for spinning one round of the digital versatile disc, which is driven by the spindle motor, the frequency counter 605 calculates the frequency of the frequency-divided wobble signal, and outputs the frequency to the determining device 606. A activation signal 608 is used to active the frequency counter 605. Finally, according to the frequency outputted from the frequency counter 605 and frequency ranges of these discs shown in FIG. 5, the determining device 606 determines the type of the digital versatile disc and outputs the type signal 610.

FIG. 7 is a flowchart showing a method according to an embodiment of the present invention. First, in step 702, relative parameters are set. In step 704, the wobble signal is obtained from the digital versatile disc. In step 706, the frequency dividing factor, ½ in the embodiment is set. In step 708, the frequency of the wobble signal is divided by the frequency dividing factor. Then, in step 710, the frequency of the frequency-divided wobble signal is calculated according to the unit time for spinning the digital versatile disc one round, which is driven by the spindle motor of the disc player.

After the frequency calculation, in step 712, the type of the disc is determined according to the frequency of the frequency-divided wobble signal. If the frequency is 0, it is determined that the type of the digital versatile disc is DVD-ROM in step 714. If the frequency falls between 140 KHz and 280 KHz, it is determined that the type of the digital versatile disc is DVD− in step 716. If the frequency falls between 800 KHz and 1.6 MHz, it is determined that the type of the digital versatile disc is DVD+ in step 718.

For digital versatile discs DVD+ or DVD−, frequency dividing factors which are frequently used are ⅔ or ½. That is, if the determination of the type of the digital versatile disc with one of these frequency dividing factors is false, another frequency dividing factor can be used.

It can be seen from the descriptions above that in the present invention, the type of the digital versatile disc is determined according to the frequency of the wobble signal, rather than the position data in the wobble signal in the conventional technology. Therefore, disadvantages of the conventional technology such as false determination and incompatibility between position data and different disc players can be avoided. The probability of correctly determining the type of the digital versatile disc can thus be enhanced.

Although the present invention has been described in terms of exemplary embodiments, it is not limited thereto. Rather, the appended claims should be construed broadly to include other variants and embodiments of the invention which may be made by those skilled in the field of this art without departing from the scope and range of equivalents of the invention.

What is claimed is:

1. A method for determining a type of a digital versatile disc (DVD), comprising:
   receiving a wobble signal from the DVD;
   detecting a frequency of the received wobble signal; and
   for every detected frequency that is between a first predetermined threshold and a second predetermined threshold, indicating the DVD as a first type, wherein the first predetermined threshold corresponds to the detected frequency while receiving a first encoded wobble frequency from an innermost portion of the wobble signal of the DVD, and wherein the second predetermined threshold corresponds to the detected frequency while receiving the first encoded wobble frequency from an outermost portion of the wobble signal of the DVD.

2. The method of claim 1, further comprising:
   for every detected frequency that is between a third predetermined threshold and a fourth predetermined threshold, indicating the DVD as a second type, wherein the third predetermined threshold corresponds to the detected frequency while receiving a second encoded wobble frequency from an innermost portion of the wobble signal of the DVD, and wherein the fourth predetermined threshold corresponds to the detected frequency while receiving the second encoded wobble frequency from an outermost portion of the wobble signal of the DVD; and
   indicating the DVD as a third type if the detected frequency is less than a fifth predetermined threshold.

3. The method of claim 2, wherein the first and second predetermined thresholds define a first range of the detected frequency corresponding to indication of the DVD as a DVD−, wherein the third and fourth predetermined thresholds define a second range of the detected frequency corresponding to indication of the DVD as a DVD+, and wherein the fifth predetermined threshold defines an upper limit of a third range of the detected frequency corresponding to indication of the DVD as a DVD-ROM.

4. The method of claim 1, wherein the first and second predetermined thresholds are based, at least in part, on a constant angular velocity of the of the DVD and on the first encoded wobble frequency.

5. The method of claim 4, wherein the first predetermined threshold is approximately 140 KHz, the second predetermined threshold is approximately 280 KHz, the third predetermined threshold is approximately 800 KHz, and the fourth predetermined threshold is approximately 1.6 MHz.

6. The method of claim 1, further comprising:
   dividing the frequency of the received wobble signal by a frequency dividing factor.

7. The method of claim 6, wherein the frequency dividing factor is one of ½ or ⅔.

8. A method for determining a type of a rotational media, comprising:
   receiving a wobble signal from the rotational media; and
   determining a frequency of the received wobble signal; and
   for every frequency that is determined to be between a first value and a second value, indicating the rotational media as a first type, wherein the first value corresponds to a first encoded wobble frequency of an innermost portion of the wobble signal of the rotational media, and wherein the second value corresponds to a second encoded wobble frequency of an outermost portion of the wobble signal of the rotational media.

9. An apparatus for determining a type of a rotational media, comprising:
   an acquisition apparatus configured to provide an acquired wobble signal based, at least in part, on reading the rotational media;
   a determining apparatus configured to receive the acquired wobble signal, to detect a frequency of the acquired wobble signal, and to determine the type of the rotational media based, at least in part, on the detected frequency of the acquired wobble signal such that for every detected frequency between a first predetermined threshold and a second predetermined threshold, the rotational media is determined as a first type, wherein the first predetermined threshold corresponds to the frequency of the acquired wobble signal while reading a first encoded wobble frequency from an innermost portion of an encoded wobble signal of the rotational media, and wherein the second predetermined threshold corresponds to the frequency of the received wobble signal while reading the first encoded wobble frequency from an outermost portion of the encoded wobble signal of the rotational media.

10. The apparatus of claim 9, wherein the acquisition apparatus is further configured to digitized the acquired wobble signal and to output the digitized wobble signal to the determining apparatus.

11. The apparatus of claim 10, wherein the determining apparatus further comprises:
    a filter coupled configured to receive the digitized wobble signal, to filter noise from the digitized wobble signal, and to provide a filtered wobble signal;

a frequency counter configured to receive the filtered wobble signal and to provide an indication signal based, at least in part, on a frequency of the filtered wobble signal; and a determining device configured to receive the indication signal and to determine the type of the rotational media based, at least in part, on the indication signal.

12. The apparatus of claim 11, wherein the frequency counter is further configured to receive an activation signal and to begin a count based, at least in part, on the activation signal.

13. The apparatus of claim 11, wherein the frequency counter is further configured to receive a spin speed signal that is based, at least in part, on a spindle motor speed, and to provide the indication signal based, in part, on the spin speed signal.

14. The apparatus of claim 10, wherein the determining apparatus further comprises:

a filter coupled configured to receive the digitized wobble signal, to filter noise from the digitized wobble signal, and to provide a filtered wobble signal;

a frequency divider configured to receive the filtered wobble signal, to divide a frequency of the filtered wobble signal by a frequency dividing factor, and to provide a divided signal;

a frequency counter configured to receive the divided signal and to provide an indication signal based, at least in part, on a frequency of the divided signal; and a determining device configured to receive the indication signal and to determine the type of the rotational media based, at least in part, on the indication signal.

15. The apparatus of claim 14, wherein the frequency dividing factor is ½.

16. The apparatus of claim 14, wherein the frequency dividing factor is ⅔.

17. The apparatus of claim 9, wherein the determining apparatus is further configured to determine the type of the rotational media such that for every detected frequency between a third predetermined threshold and a fourth predetermined threshold, the rotational media is determined as a second type, wherein the third predetermined threshold corresponds to the frequency of the acquired wobble signal while reading a second encoded wobble frequency from an innermost portion of the rotational media, and wherein the fourth predetermined threshold corresponds to the frequency of the acquired wobble signal while reading the second encoded wobble frequency from an outermost portion of the rotational media, and such that the rotational media is determined as a third type if the frequency of the acquired wobble signal is less than a fifth predetermined threshold.

18. The apparatus of claim 17, wherein the first and second predetermined thresholds define a frequency range of the acquired wobble signal corresponding to indication of the rotational media as a DVD−, wherein the third and fourth predetermined thresholds define a frequency range of the acquired wobble signal corresponding to indication of the rotational media as a DVD+, and wherein the fifth predetermined threshold defines an upper limit of a frequency range of the acquired wobble signal corresponding to indication of the rotational media as a DVD-ROM.

19. An apparatus for determining a type of a rotational media, comprising:

means for reading an encoded wobble signal from the rotational media; and means for providing a read wobble signal based, at least in part, on the encoded wobble signal;

means for determining the type of the rotation media based, at least in part, on a frequency of the read wobble signal, such that for every frequency of the read wobble signal between a first predetermined threshold and a second predetermined threshold, the rotational media is determined as a first type, wherein the first predetermined threshold corresponds to the frequency of the read wobble signal while an innermost portion of the encoded wobble signal of a first frequency is read, and wherein the second predetermined threshold corresponds to the frequency of the read wobble signal while an outermost portion of the encoded wobble signal of the first frequency is read.

20. The apparatus of claim 19, wherein the first and second predetermined thresholds are based, at least in part, on a constant angular velocity of the of the rotational media and on the first frequency of the encoded wobble signal.

21. The apparatus of claim 19, wherein the means for determining the type of the rotational media further determines the type of the rotational media such that for every frequency of the read wobble signal between a first predetermined threshold and a second predetermined threshold, the rotational media is determined as a second type, wherein the third predetermined threshold corresponds to the frequency of the read wobble signal while an innermost portion of the encoded wobble signal of a second frequency is read, and wherein the fourth predetermined threshold corresponds to the frequency of the read wobble signal while an outermost portion of the encoded wobble signal of the second frequency is read, and such that the rotational media is determined as a third type if the frequency of the read wobble signal is less than a fifth predetermined threshold.

22. The method of claim 21, wherein the first predetermined threshold is approximately 140 KHz, the second predetermined threshold is approximately 280 KHz, the third predetermined threshold is approximately 800 KHz, and the fourth predetermined threshold is approximately 1.6 MHz.

* * * * *

UNITED STATES PATENT AND TRADEMARK OFFICE
CERTIFICATE OF CORRECTION

| | | |
|---|---|---|
| PATENT NO. | : 7,626,907 B2 | Page 1 of 1 |
| APPLICATION NO. | : 10/908746 | |
| DATED | : December 1, 2009 | |
| INVENTOR(S) | : Chang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this

Twenty-eighth Day of September, 2010

David J. Kappos
*Director of the United States Patent and Trademark Office*